United States Patent

[11] 3,630,231

[72] Inventor Franz Georg Miller
Hofingen, Germany
[21] Appl. No. 9,273
[22] Filed Feb. 6, 1970
[45] Patented Dec. 28, 1971
[73] Assignee Techap F. G. Miller Techn.-Chem.-
Apparatebau Programmsteuergerate und
Anlagen Stellglieder
Hofingen, Germany

[54] MULTIWAY SWITCH VALVE
12 Claims, 4 Drawing Figs.
[52] U.S. Cl. ..................................................... 137/625.16
[51] Int. Cl. ....................................................... F16k 11/00
[50] Field of Search ............................................ 137/625.16,
625.15, 625.19; 251/360, 174

[56] References Cited
UNITED STATES PATENTS
1,103,439 7/1914 Schultz ......................... 137/625.16
2,591,102 4/1952 Snyder ......................... 137/625.16
2,702,050 2/1955 Thomas ........................ 137/625.16
2,898,082 8/1959 Von Almen et al. .......... 251/360 X
3,370,612 2/1968 Holl .............................. 251/174 X
3,439,897 4/1969 Priese et al. .................. 251/174 X
3,459,228 8/1969 Mongodin et al. ........... 137/625.16 X
3,472,484 10/1969 Parker .......................... 251/174 X Primary Examiner—Samuel Scott
Attorney—Edwin E. Greigg ABSTRACT: A multiway switch valve having a housing that includes a chamber and a plurality of channels merging into said chamber and terminating in coupling nipples at the outside of the valve; a channelled valve plug rotatably held in said chamber and adapted to assume a plurality of positions to interconnect selected ones of said channels, said plug has a sealing face in the shape of a spherical section; packing rings surrounding each channel opening in said chamber to provide a continuous fluidtight seal between said openings and said sealing face.

MULTIWAY SWITCH VALVE

BACKGROUND, OBJECT AND SUMMARY OF THE INVENTION

This invention relates to a multiway switch valve for particular use in cyclically operating liquid treating systems for example, for the softening, desalinization or filtration of water utilizing the ion exchange process.

It is an object of the invention to provide an improved multiway switch valve which has a particularly simple and operationally safe structure and which effectively seals from one another, and also outwardly, cyclically established various connections inside the valve and further is adapted to perform rapid switching operations.

Briefly stated, according to the invention, in a multiway switch valve of the aforenoted type there is provided a valve chamber provided with a plurality of valve chamber openings for the inlet and outlet of fluids; there is further provided a multichannelled plug rotatable in the valve chamber about a central axis to interconnect or block selected openings dependent upon the angular position of the plug. The latter, for the purpose of sealing at least some of the openings in the valve chamber, has a sealing face in the shape of a spherical sector in which there are provided at least some of the plug channel openings. The valve chamber openings disposed immediately adjacent said sealing face are adapted to engage said face in a fluidtight manner.

The invention will be better understood, as well as further objects and advantages will become more apparent, from the ensuing detailed specification of an exemplary embodiment of the invention taken in conjunction with the drawings.

DESCRIPTION OF A SYSTEM INCORPORATING THE INVENTION

Figure 1:
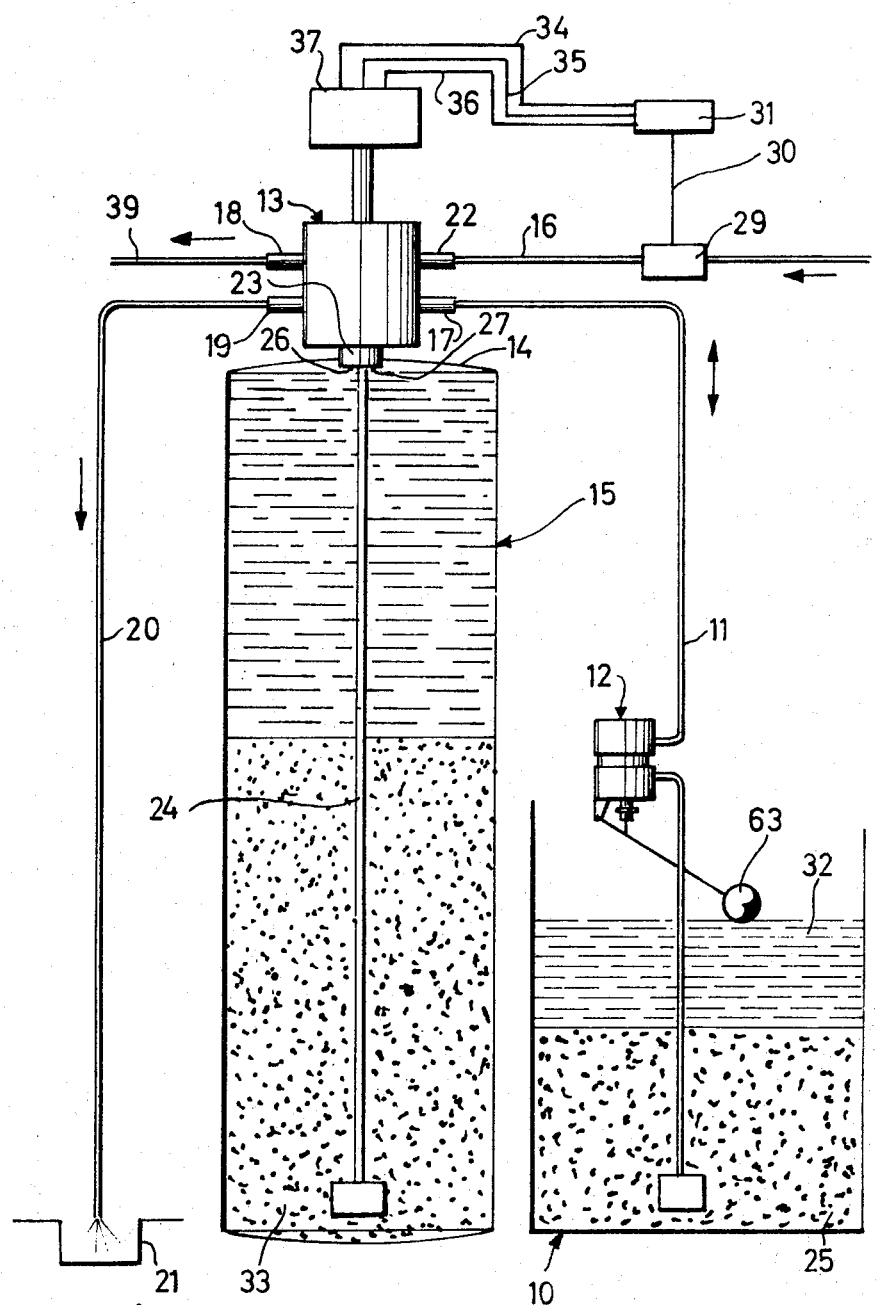
FIG. 1 is a diagrammatic view of a water-treating system incorporating the invention.
Figure 2:
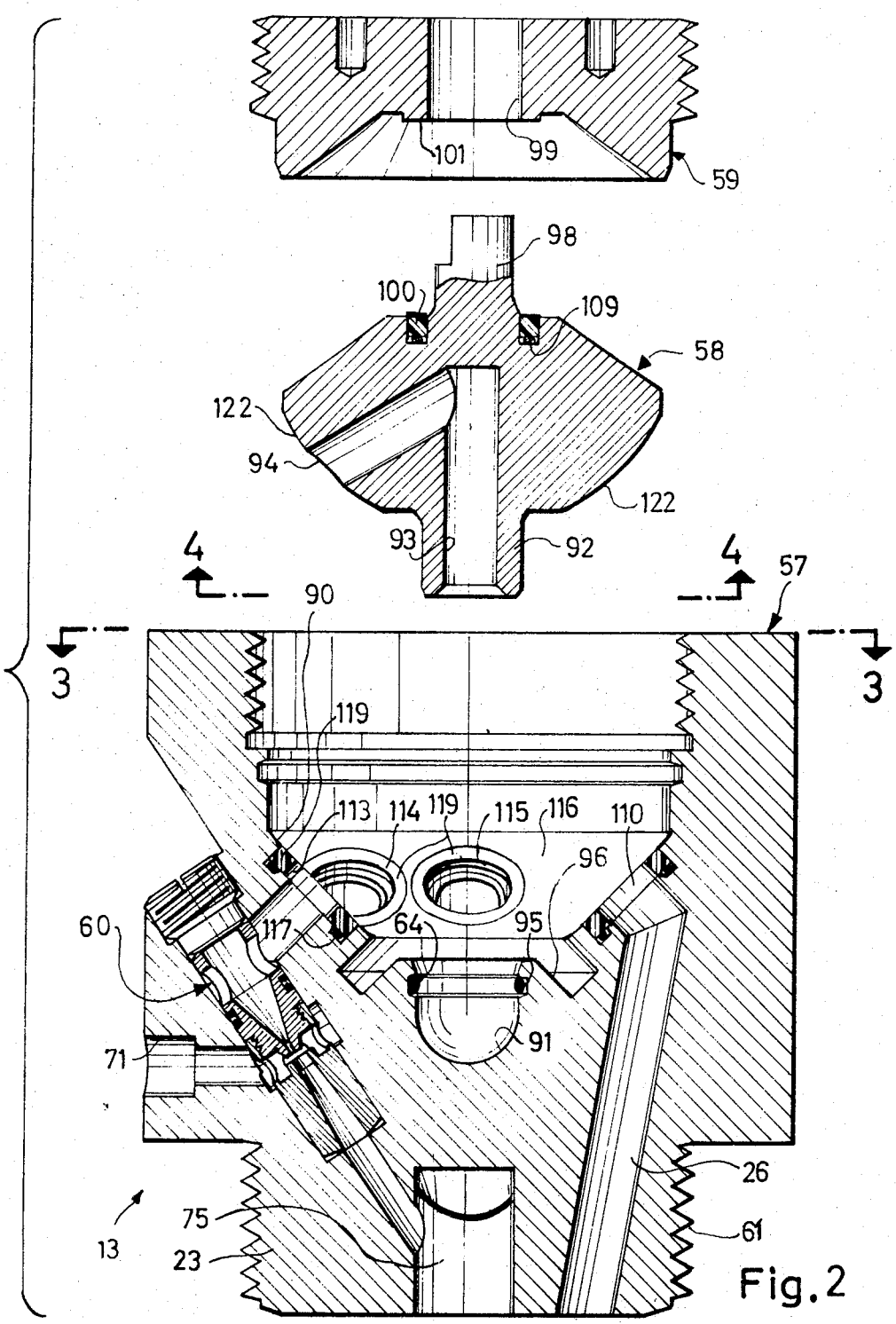
FIG. 2 is an axial sectional exploded view of a multiway switch valve constituting a preferred embodiment of the invention and incorporated in the system according to FIG. 1.
Figure 4:
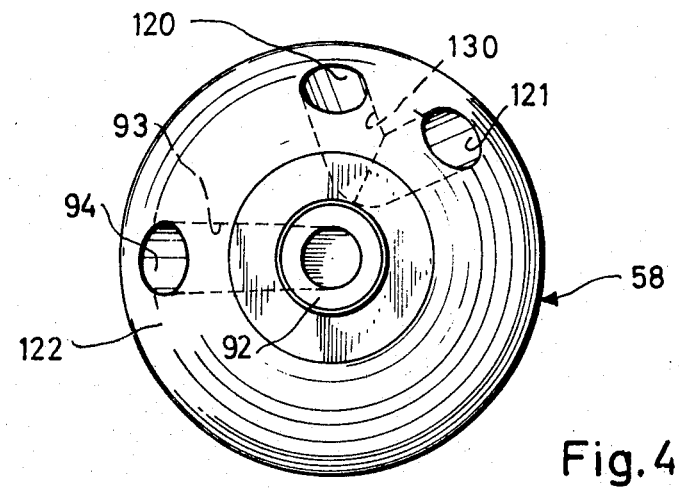
FIG. 4 is a bottom plan view of one part of the multiway switch valve as viewed in the direction of line 4—4 of FIG. 2.
Figure 3:
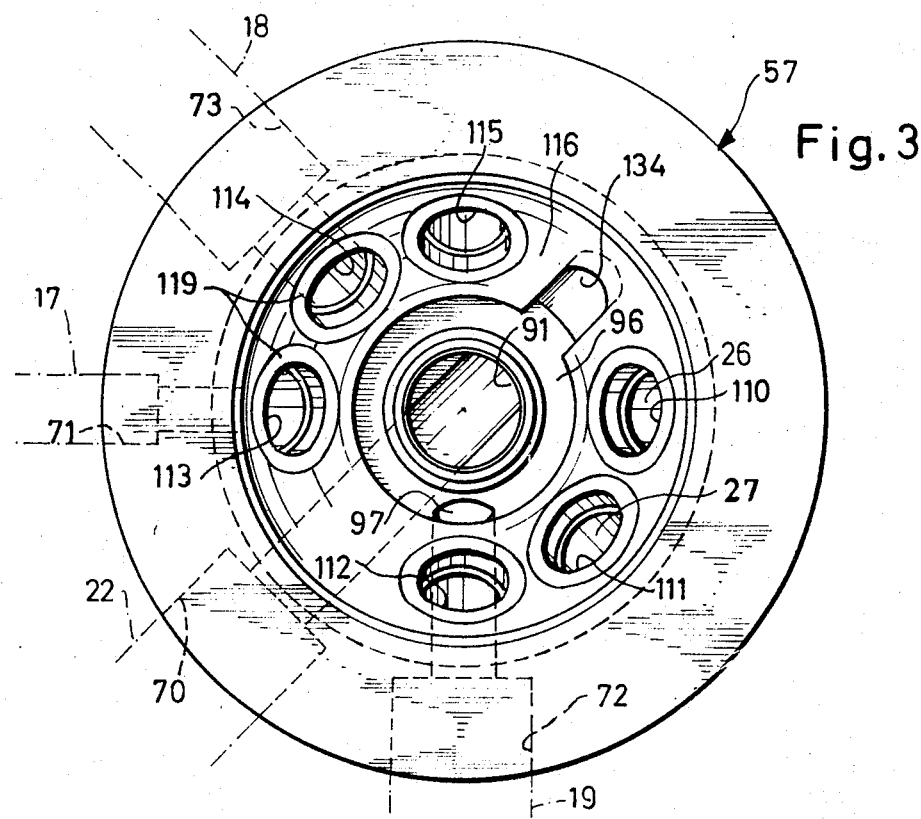
FIG. 3 is a top plan view of one part of the multiway switch valve as viewed in the direction of lines 3—3 of FIG. 2.

Turning now to FIG. 1, there is shown by way of example, a water-softening system which may advantageously incorporate the multiway switch valve according to the invention. The system comprises a recovery tank 10 which communicates with a multiway switch valve 13 through a recovery conduit 11 in which there is disposed a dual float valve 12 actuated by the float 63. The multiway switch valve 13, which forms the subject of the invention and will thus be described in greater detail with reference to FIGS. 2-4, is mounted on the closure 14 of a treating tank 15 and is provided with the following nipples: an inlet nipple 22 for the untreated water flowing through the conduit 16; a nipple 17 attached to the recovery conduit 11; an outlet nipple 18 for the softened water; an outlet nipple 19 through which waste water may be directed across an adjoining waste conduit 20 to a gutter 21; a central nipple 23 which has a channel coupled to the conduit 24 for carrying liquid to or from the vicinity of the base of tank 15 and two channels 26, 27 for carrying liquid to or from the vicinity of the upper end of the tank 15.

The supply conduit 16 for untreated water contains a flowmeter 29, the indicator sensor outlet of which is connected through a conduit 30 to a counting device 31. The latter, upon sensing predetermined flow quantities, generates in the outlet conduits 34, 35 or 36 successive pulses which energize a setting device 37, such as a setting motor, for actuating the switch valve 13.

In the recovery tank 10 there is placed a solid recovery agent 25 (such as common salt) which is in equilibrium with a saturated solution 32 of said recovery agent. The treating tank 15 contains an ion exchanger 33 of suitable known-type.

The operation of the water-treating system outlined hereinabove will now be described. Prior to the beginning of a cycle consisting of three successive cycle phases, the counting device 31 is in its zero setting and the tank 15 is filled with untreated water. The valve 13 is in a switching position corresponding to the first cycle phase in which untreated water flowing across the conduit 16 is, through the outlet channel 26, directed from above downwardly into the tank 15. From the base of the tank 15 the softened water is directed across the conduit 24 into the outlet nipple 18 and the adjoining outlet conduit 39. The untreated water flowing through the conduit 16 is in this manner continuously softened.

The quantity of the supplied untreated water and thus the quantity of water softened in this phase is, by means of the flowmeter 29, measured and counted in the counting device 31. Upon reaching a predetermined count, an impulse signal is given through the conduit 34, whereupon the setting device 37 actuates the switch valve 13 which is thus set into a position corresponding to the second cycle phase.

In the second cycle phase the untreated water flowing through the conduit 16 is, through the conduit 24, introduced in the vicinity of the bottom of tank 15. Therefrom the water proceeds upwardly in the tank 15 and is, across the channel 27, directed to the waste conduit 20 and then to the gutter 21. The untreated water flows through an injector (water jet pump) 60 disposed in the switch valve 13 (FIG. 4), whereby the recovery agent is drawn across the conduit 11 and mixed to the untreated water in a predetermined ratio. In this manner, during the second cycle phase, the treating material in the tank 15 is regenerated. This recovery process lasts as long as the counting device 31 has reached a predetermined second count. Thereupon, the counting device 31 sends an impulse through the conduit 35 to the setting device 37 for again actuating the switch valve 13 which is thus set into a third position corresponding to the third cycle phase.

During the third cycle phase, untreated water exists from the channel 27 and is forced through the tank 15 from the top downwardly for the purpose of rinsing the treating material 33. The untreated water flows across the conduit 24 and is directed in part into the waste conduit 20 and in part into the conduit 11 to refill the tank 10. The third cycle phase is terminated as soon as the counting device 31 has reached a predetermined third count, whereupon there is transmitted through the conduit 36 an impulse signal to the setting device 37 for again actuating the switch valve 13 which is thus set into the aforenoted first switching position. Simultaneously, the counting device 31 is reset into its zero position and a new cycle may begin.

The liquid recovery agent drawn from the tank 10 during the second cycle phase is, during the third cycle phase, replaced by the water flowing through the conduit 24, the tank 15, the valve 13 and the conduit 11. This water quantity is then enriched with the recovery agent in tank 10 until a saturated solution is obtained therein.

DESCRIPTION OF THE MULTIWAY SWITCH VALVE

Turning now to FIGS. 2–4, there is shown a multiway switch valve 13 used in the system discussed in connection with FIG. 1 by way of example and constituting a preferred embodiment of the invention.

The valve 13 includes a housing 57, a plug 58 and a threaded closure 59, all illustrated in an exploded manner in FIG. 2. These parts may be made of a synthetic material. It has been found particularly advantageous to make the valve of a food-resistant synthetic material which is so designated because it is unaffected by the acid or similar substances contained in food material. Such plastic materials are well known and therefore are not discussed in more detail.

In the housing 57 there are provided four lateral channels 70, 71, 72 and 73, which lead to the respective nipples 22, 17, 19 and 18 shown in dash-dotted line. The channel 70 serves for the admission of untreated water, the channel 71 admits the recovery agent, the channel 72 carries away waste water and the channel 73 carries away treated water. Integral with the underside of the housing 57 there is formed a central nipple 23 which is provided with a thread 61. The frontal face of nipple 23 contains the terminal opening of channels 75, 26 and 27. Of these channels, channel 75 is connected with the conduit 24, while the other channels 26 and 27 correspond to the channels 26, 27 of FIG. 1.

The preferred embodiment of the multiway switch valve according to the invention has a structure adapted to perform an operation required by the process described in connection with FIG. 1. The valve 13 is thus adapted to be set into three different switching positions, each permitting the performance of one of the three cycle phases described hereinabove. The housing 57 contains a valve chamber 90 which has a base provided with a central depression 91. The latter is connected with the supply channel 70 for the intake of untreated water. The depression 91 also serves as a bearing for the tubular stub 92 of the plug 58. Thus, the untreated water enters the switch valve 13 through channel 70, and passing through the plug channels 93 and 94, may flow out from the switch valve through that housing channel which is in registry with plug channel 94. About the depression 91 there is arranged an annular groove 95 receiving an annular packing ring 64 to seal the stub 92. The depression 91 is surrounded by an open annular collecting channel 96 which communicates with the channel 72 through a conduit 97 and collects as well as removes the liquid which leaks into the valve chamber during the switching movements of the plug 58.

The plug 58 is further provided with an integral setting pin 98 which projects through a central opening 99 of the closure 59 and by means of which the plug 58 may be rotated. In an annular groove surrounding the pin 98 and provided in the upper face of plug 58, there is inserted an O-ring 100, preferably made of Teflon. The latter is pressed against an inner annular face 101 of closure 59 and is axially resiliently supported in said groove by means of an elastic ring 109. Thus, the plug 58, by means of the pressure exerted by the closure 59 threadedly tightened to housing 57, is elastically pressed against housing channel openings 110, 111, 112, 113, 114 and 115 arranged in a circular array about the rotational axis of the plug 58. In order to provide hereby a secure seal about each plug channel opening 94, 120 and 121 arranged on the periphery of the plug, the latter has, in the range of the aforenamed openings, a sealing face 122 having a configuration of a convex spherical segment. The face 116 of the plug chamber in which there are disposed the housing channel openings 110–115, is formed as a convex spherical segment. The radius of face 122 is slightly smaller than that of face 116. The two said faces are arranged in a concentric complemental relation when the switch valve 13 is in an assembled condition.

The opening of each channel 110–115 on face 116 is defined by an O-ring 119 made, for example, of Teflon. Each O-ring 119 is superimposed on a ring 117 made of a food-resistant rubber. Each ring 117 simultaneously serves as a seal and resilient support for the associated O-ring 119. Each of the latter projects slightly beyond the sealing face 116 of the chamber 90 and is urged with a uniform pressure against the sealing face 122 of the plug 58. By virtue of the spherical configuration of sealing face 122, a secure seal will be obtained even under unfavorable conditions. Preferably, the spherical surface, which forms the sealing face 122, is disposed under the horizontal equatorial plane of the sphere. Stated differently, the spherical sealing face 122 is disposed solely at one side of an equatorial plane which is normal to the rotational axis of the plug 58 and which belongs to an imaginary sphere that complements the face 122. This feature permits a particularly easy assembly of the valve and also the provision of a simple housing design.

The opening 112 is associated with the waste water channel 72 and the opening 113 with the channel 71. Through the opening 113 there is introduced untreated water into an injector of known type indicated at 60. By drawing liquid regenerating agent across channel 71, the untreated water is mixed to a regenerating mixture flowing through channel 75 as it has already been described hereinabove.

The opening 114 is associated with channel 73 for carrying away treated water, whereas the opening 115 communicates with the channel 75.

The two openings 120 and 121 in the plug 58 are associated with a common transfer channel 130.

In the sealing face 116 there is further provided an additional depression 134 which communicates with the collecting channel 96 and, depending upon the position of the plug 58, forwards waste water into the waste water channel 72 either from the opening 110 or from the opening 115.

The operation of the aforedescribed multiway switch valve 13 has already been described in connection with FIG. 1. It is therefore merely noted that the transfer channel 130 interconnects in a fluidtight manner in the first cycle phase the openings 114 and 115, in the second cycle phase the openings 111 and 112, and in the third cycle phase the openings 115 and 134. Further, the plug channel 94 is aligned in the first cycle phase with the opening 110, in the second cycle phase with the opening 113 and in the third cycle phase with the opening 111.

It is to be understood that the multiway switch valve depicted in FIGS. 2–4 is merely a preferred embodiment of the invention and may be varied in many ways without departing from the scope of the invention. For example, the switching valve according to the invention, may be so designed that instead of three positions, it may assume four or more positions and may be provided with a desired number of ports, openings, transfer channels, inlet and outlet nipples, etc. as will be apparent to those skilled in the art.

It is to be noted that in addition to its function as a switching valve, the structure according to the invention may also serve as a mixer or distributor of fluids. The valve according to FIGS. 2–4, for example, performs a mixing function in the second cycle phase were untreated water is added to the regenerating material within the valve.

If it is desired to adjust the flow rate for different container dimensions, there may be provided throttle means formed as replaceable flow restricting inserts attachable into the openings 110–115.

What is claimed is:
1. A multiway switch valve, comprising,
A. a valve housing,
B. a valve chamber formed in said valve housing,
C. a plurality of fluid-carrying housing channels formed in said valve housing, each said housing channel having a terminal opening merging into said valve chamber,
D. a valve plug rotatably disposed in said valve chamber, said valve plug having a sealing face in the shape of a spherical segment, said sealing face being disposed solely at one side of an equatorial plane normal to the rotational axis of said valve plug and belonging to an imaginary sphere complementing said sealing face,
E. a plurality of fluid-carrying plug channels formed in said valve plug, each said plug channel having a terminal opening on the surface of said plug, at least some of the last-named openings being disposed on said sealing face,
F. means for effecting a fluidtight engagement between at least some of said housing channel openings and said sealing face of said valve plug,
G. means for pressing said sealing face in the direction of said axis against the housing channel openings opposite said sealing face and
H. means for rotating said valve plug into any one of a plurality of positions to interconnect selected ones of said housing channels by means of said plug channels.
2. A multiway switch valve as defined in claim 1, wherein the housing channel openings engaging said sealing face of said valve plug are annular in shape.

3. A multiway switch valve as defined in claim 1, wherein the housing channel openings that are in engagement with said sealing face of said valve plug are disposed in a circular array about the rotational axis of said valve plug.

4. A multiway switch valve as defined in claim 1, wherein said means for effecting said fluidtight engagement includes packing rings each surrounding a housing channel opening and engaging said sealing face of said valve plug, said packing rings project from the wall face of said valve chamber inwardly thereof.

5. A multiway switch valve as defined in claim 4, wherein said packing rings are made of Teflon.

6. A multiway switch valve as defined in claim 4, wherein the wall face of said valve chamber and said sealing face of said valve plug are spaced from one another; the space defined by said faces is in continuous communication with a discharge channel constituting one of said housing channels.

7. A multiway switch valve as defined in claim 1, including a central depression provided in said valve chamber; said central depression is in continuous communication, on the one hand, with one of said housing channels and, on the other hand, with a centrally disposed plug channel; one opening of the last-named channel terminates on said sealing face of said plug.

8. A multiway switch valve as defined in claim 7, including a central cylindrical bearing stub integral with said valve plug and seated rotatably and in a fluidtight manner in said central depression.

9. A multiway switch valve as defined in claim 1, including means generating a springing force in the direction of said axis for resiliently pressing said sealing face against the housing channel openings opposite said sealing face.

10. A multiway switch valve as defined in claim 9, including
A. a closure covering said valve chamber and including a central opening,
B. a setting pin integral with said valve plug and projecting through said central opening, said setting pin forming part of said means for rotating said valve plug and
C. resilient ring means disposed about said setting pin and compressed between said valve plug and said closure, said resilient ring means constituting said means generating said springing force.

11. A multiway switch valve, comprising,
A. a valve housing,
B. a valve chamber formed in said valve housing and having a wall,
C. a plurality of fluid-carrying housing channels formed in said valve housing, each said housing channel having a terminal opening merging into said valve chamber,
D. a valve plug rotatably disposed in said valve chamber, said valve plug having a sealing face in the shape of an annular section of a spherical surface,
E. a plurality of fluid-carrying plug channels formed in said valve plug, each said plug channel having a terminal opening on the surface of said plug, at least some of the last-named openings being disposed on said sealing face,
F. an opening annular collecting channel provided in a base wall of said valve chamber for gathering liquid leaking between said valve plug and the wall of said chamber,
G. means for effecting a fluidtight engagement between at least some of said housing channel openings and said sealing face of said valve plug and
H. means for rotating said valve plug into any one of a plurality of positions to interconnect selected ones of said housing channels by means of said plug channels.

12. A multiway switch valve as defined in claim 11, including a discharge channel communicating with said collecting channel and constituting one of said housing channels.

* * * * *